Feb. 16, 1965     A. DILLENBURGER     3,169,758
TELESCOPIC SHOCK ABSORBERS
Filed Sept. 13, 1962
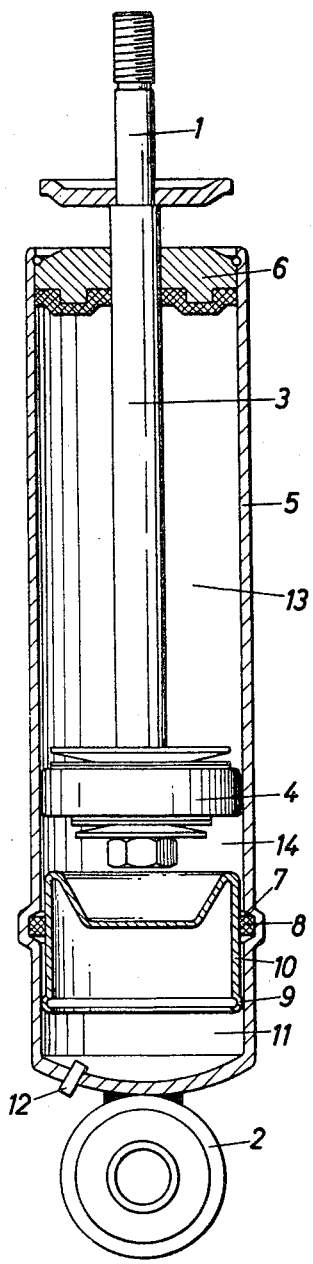
INVENTOR
ALBERT DILLENBURGER

United States Patent Office 3,169,758
Patented Feb. 16, 1965

3,169,758
TELESCOPIC SHOCK ABSORBERS
Albert Dillenburger, Andernacher Strasse 28a,
Koblenz-Luetzel, Germany
Filed Sept. 13, 1962, Ser. No. 223,558
Claims priority, application Germany, Sept. 20, 1961,
D 37,066
4 Claims. (Cl. 267—64)

The present invention concerns telescopic shock absorbers. A known form of telescopic shock absorbers intended more especially for installation in automotive vehicles comprises a working cylinder, a working piston slidably mounted therein and a piston shaped compensating element for taking account of the immersion depth of the connecting rod in the shock absorbing fluid alternating in operation and of variations in the fluid density due to the temperature changes within the cylinder, this compensating element being biased by the pressure of a spring or preferably by a gas cushion subjected to excess pressure of 5, 20, 30 or more atmospheres, and being pressed by the spring or the gas pressure against the shock absorbing fluid. This compensating piston is of metal and on its outer circumference carries one or more elastic packing rings, because it simultaneously constitutes a separating element, the object of which is to separate the liquid and the gaseous medium in the piston cylinder from one another and when the working piston is axially displaced, has to prevent particles of liquid escaping into the gas chamber or quantities of gas gathering into the fluid chamber.

The compensating or separating piston must therefore be perfectly sealed relative to the inner wall surface of the working cylinder and accurately fitted therein. To obtain a perfect seal it is necessary for the inner wall surface to be perfectly smooth and free of grooves. Since during the conventional drawing operation of metal cylinders it is never possible entirely to avoid unevennesses of the inner wall surface of the cylinder, cylinders intended for producing shock absorbers necessitate time wasting and cost increasing finishing by honing and subsequent buffing. It is thereby impossible to avoid within a production series imparting an unequal diameter in the lumen of the individual cylinders. This difference of one cylinder from the other also necessitates on assembly of the shock absorbers, a time wasting and cost increasing individual fitting of the compensating pistons in the cylinders. Even a shock absorber mounted accurately in this sense however in operation soon suffers from the seal against the cylinder wall of the compensating piston being impaired, because the separating piston of metal constantly rubs against the metal inner wall surface of the working cylinder, the internal cylinder wall surface being worn out further sooner or later and thereby gradually causing the sealing action to deteriorate. To avoid this it has already been proposed to stretch a skin of synthetic rubber, e.g. "Perbunan" over the compensating piston and to provide it at the end face with a lip packing facing the fluid supply. This causes the compensating piston to get into the displacement section of the working piston, again resulting in damage to the sealing surface due to metal friction.

The object of the present invention is to provide a shock absorber which avoids these difficulties by means of a novel and peculiar configuration and mounting of the compensating piston.

According to the present invention the compensating piston consists of a rigid cylinder open at the bottom of metal, light metal, plastics material or the like which is mounted so as to slide within a surrounding packing ring of elastic material such as rubber, "Perbunan" or the like and makes contact with the inner wall of the working cylinder only with a narrow guide bulge provided on its lower edge, whilst the whole remaining peripheral surface moves remote from the front and slides only on the inner surface of the elastic packing ring. In turn, this guide edge is in fact also in frictional contact with the cylinder wall and is able to work out somewhat; this does not however endanger the seal of the device, because the frictional path of the guide bulge is not situated at the definition between fluid charge and gas cushion, but more or less within the gas compartment, where sealing is not necessary at all.

It is of course possible for the rigid part of the compensating piston to be in the form of a cylinder closed at the top and bottom. The configuration in the form of a cylinder closed at the top and open at the bottom, thus in the shape of an inverted pot, however is particularly favourable because in this way there is presented a large hollow space for the compressed gas or for receiving a mechanical spring, both of which force the compensating piston upwards against the fluid charge.

The configuration and arrangement of the compensating piston in accordance with the invention involves a plurality of advantages. On the one hand drawn working cylinders may be used without finishing the inner wall surface and the installation and fitting of the compensating pistons on assembling the device considerably simplified. On the other hand the shock absorber constructed in accordance with the invention ensures a constant and reliable seal between fluid and gas compartment and a long life, even at high pressures and high temperatures up to about 200° C. Production of the compensating piston can be made very simple and cheap. It may, for example be fashioned of sheet, the sealing surface adapted to be produced by centreless grinding and super finish on automatic machines having very small diameter tolerances. The guide bulge or guide edge may be applied by means of a roller on completing the sealing surface.

The elastic packing ring may be loosely inserted in a groove formed in the working cylinder, or for example, vulcanized thereto. It may have the shape of a ring of round or rectangular cross-section or of a lip packing. All elastic or oil resistant materials with a high resistance to temperature may be used for the packing ring, for example, "Perbunan" or "Viton" (registered trademarks).

The invention will be described further by way of example with reference to the accompanying drawing, in which the single figure is a longitudinal section of an examplary embodiment of the shock absorber of the invention.

The working cylinder 5 is closed at the top end with a closure wall 6 so as to be air and liquid tight, and its lower closed end carries the connecting part 2. The working piston 4 is mounted so as to be slidable axially within the working cylinder 5, is fixed to the connecting rod 3, and has the throttle passages and throttle valves formed therein, not shown in the drawing. The connecting rod 3 passes axially and liquid tightly through an aperture in the closure wall 6 and continues in a connecting part 1. The device is fixed by means of one or both connecting parts 1 and 2 to the parts of the automotive vehicle the relative vibrations of which are to be absorbed.

In the lower part of the working cylinder 5 and beneath the lowermost position of the working piston 4 a peripheral groove 7 is formed in the wall surface of the cylinder, in which groove a packing ring 8 of elastic oil resistant material is inserted, cemented, vulcanized in or fixed in any other way. It is also possible for several grooves and packing rings to be arranged one above the other. The cross-section of the packing ring may be selected to be higher or even wider than shown. Within the packing ring adapted to be displaced relative thereto and arranged to slide therein is the compensating piston 10 which in this case has the form of an inverted pot with the inverted base of which constitutes a crown recessed concavely to avoid the working piston striking thereagainst. On its lower edge it has a guide bulge 9 which with its maximum width is in sliding engagement with the cylinder wall surface and guides the compensating piston straight.

In this embodiment, having both a lower overall height and a hollow construction of the compensating piston open at the bottom, quite a spacious compartment 11 for the compressed gas or the compression spring is provided. This compartment can be filled with compressed gas through an opening or an inlet valve 12 in the cylinder base.

The apparatus operates as follows:

If the working piston 4 is displaced upwardly in the direction of the closure wall 6 (high pressure shock absorption), then the non-compressible fluid is displaced out of the space 13 from the surface of the piston 4 through the throttle passages formed therein into the space 14 below the working piston, while simultaneously it reduces the volume of the connecting rod 3 which is immersed in the oil charge. The space 14 below the piston 4 increasing during the upward movement thereof could also accommodate more fluid than can be supplied from the space 13 through the piston 4. To compensate this lack of volume of fluid caused by the smaller immersed volume of the connecting rod, the compensating piston 10 slides within the packing ring 8 under the pressure of the compressed gas cushion in the space 11 also upwardly thereby reducing the space available for the oil by the reduction amount of the immersed volume of the connecting rod.

If subsequently the working piston 4 is displaced in the reversed direction, i.e. downwardly (rebound or low pressure shock absorption) then a proportion of the fluid is forced back from the space 14 below the working piston 4 through the throttle valves and throttle passages in the working piston upwardly into the space 13, whilst simultaneously the immersed volume of the connecting rod 3 into the oil is again increased, so that the connecting rod plus oil in this low position of the working piston require a larger space within the cylinder than in the above described uppermost position. This larger space is provided by the fact that the compensating piston 10 is downwardly displaced against the compressible compressed gas cushion or a compressible spring supported against the cylinder base.

The principle of the above described shock absorber is also transferrable to load supporting telescopic legs by accordingly altering the dimensions.

I claim:

1. A shock absorber comprising a cylinder, a working piston in the cylinder having a piston rod connected thereto, a compensating piston in the cylinder between the working piston and cylinder head, said compensating piston being cup shaped and having a rounded guide bulge for sliding engagement with the cylinder wall, a sealing ring secured to the cylinder wall and in sealing engagement with the compensating piston, the sealing ring and guide bulge providing spaced supports for said compensating piston, and means for supplying gas under pressure to the space between the compensating piston and cylinder head.

2. A shock absorber comprising a cylinder, a working piston in the cylinder having a piston rod connected thereto, a compensating piston in the cylinder between the working piston and cylinder head, and means slidably supporting said compensating piston at spaced points, at least one of said supports comprising a groove in the cylinder and a seal bonded in said groove having sealing engagement with the piston.

3. A device as in claim 2 further including a spring between the compensating piston and the head of the cylinder.

4. A shock absorber comprising a cylinder, a working piston in the cylinder, and a connecting rod connected to the piston, a compensating piston in the cylinder between the working piston and cylinder head, a means slidably supporting said compensating piston at spaced points, one of said supporting means having sealing engagement with the piston and cylinder and the other of said supporting means comprising a rounded guide bulge on the piston with the rounded surface bearing against the cylinder.

References Cited in the file of this patent

UNITED STATES PATENTS

| | | |
|---|---|---|
| 1,898,694 | Sikorsky | Feb. 21, 1933 |
| 2,093,386 | Tear | Sept. 14, 1937 |
| 2,774,446 | Bourcier de Carbon | Dec. 18, 1956 |
| 2,774,619 | Mercier | Dec. 18, 1956 |
| 2,780,504 | Russell | Feb. 5, 1957 |
| 2,790,462 | Ashton | Apr. 30, 1957 |
| 2,876,799 | Mercier | Mar. 10, 1959 |

FOREIGN PATENTS

| | | |
|---|---|---|
| 711,704 | Great Britain | July 7, 1951 |
| 1,115,926 | France | May 2, 1956 |
| 1,132,054 | France | Mar. 5, 1957 |